Feb. 1, 1966   J. MARLOW ETAL   3,233,167
POWER CONTROL CIRCUIT
Filed March 31, 1961   2 Sheets-Sheet 1 ized Statesent Office 3,233,167
Patented Feb. 1, 1966

3,233,167
POWER CONTROL CIRCUIT
Jacob Marlow, King of Prussia, and Egils H. Evalds, Philadelphia, Pa., assignors to Robertshaw Controls Company, Richmond, Va., a corporation of Delaware
Filed Mar. 31, 1961, Ser. No. 99,810
18 Claims. (Cl. 323—65)

This invention relates to control circuits and more particularly to control circuits capable of using low power capacity controlling impedance for controlling the output of self-saturating magnetic amplifiers.

In many control systems, it is necessary that a large amount of power be supplied to a load and that the amount supplied be varied in response to some physical condition or selected by the operator. A large number of devices are known that present an impedance that varies in proportion to changes in a physical condition and have a number of favorable characteristics, such as size, rapid response, long life, minimum maintenance, and are low in cost. However, a large number of these devices, otherwise especially suitable, have limited use in systems controlling the transfer of a large quantity of power to a load because of their small power capacity. Such limitations can generally be overcome by increasing the complexity of the system, but this is obviously undesirable.

Some control circuits in addition to requiring a control impedance device having a substantial power capacity can only utilize devices which vary directly with a physical condition or devices which vary indirectly with a physical condition, but cannot utilize both types of devices. This limits the number of condition responsive impedance devices that may be used as the controlling impedance in such control circuits.

In addition, it is desirable in some applications to vary the power supplied to a load from a minimum to maximum with a relatively small percentage change in the impedance of the controlling impedance element.

These requirements and limitations are applicable to the control circuits for self-saturating magnetic amplifiers. It is, accordingly, a primary object of the invention presented herein to provide a control circuit capable of using a variable control impedance of low power capacity for use with a circuit having a unidirectional conductive device connected in series with another circuit element for controlling the current flow in the circuit element when the unidirectional conductive device is presenting a high impedance to the flow of current.

Another object is to provide such a circuit which is extremely simple and highly effective for controlling the output of half-wave or full-wave self-saturating magnetic amplifiers.

Another object of the invention is to provide such a control circuit which can use control impedances having either negative or positive control slope characteristics.

A further object of the invention is to provide a control circuit using a transistor to vary the reset current for the saturable reactor of a magnetic amplifier in response to changes in an impedance element.

An additional object is to provide a simple positive feedback path from the magnetic amplifier to the control circuit for a decreased proportional control band.

Still another object is to provide a simple negative feedback path from the magnetic amplifier to the control circuit for increasing the proportional control band.

In accordance with a particular form of the invention, the circuit for controlling the power delivered to the load from a half-wave or full-wave self-saturating magnetic amplifier comprises a control circuit connected in parallel with a unidirectional current conducting device that is connected in series with a saturable reactor of the amplifier. The control circuit includes two series resistance elements, at least one of which is variable, connected in parallel with the unidirectional device. The transistor of the NPN or PNP type is connected to conduct in response to the voltage developed across the two resistance elements when the unidirectional device is presenting the greatest impedance to the flow of current to increase the current through the saturable reactor for resetting the flux in the saturable reactor. The amount of reset and, therefore, the output of the magnetic amplifier, is thus determined by the resistance presented by the two resistance elements which control the output of the transistor. The current passing through the two resistance elements is small so that devices presenting a variable resistance in response to changes in a physical condition, though having small power capacity, may be used to control the output of a full-wave or half-wave self-saturating magnetic amplifier. Further, control is obtained by using a feedback circuit connected between the end of the saturable reactor away from the control circuit and a point intermediate the ends of the two series connected resistance elements. The feedback circuit can be connected to provide regenerative or degenerative feedback. A single resistance element can be used to provide the feedback circuit.

For a better understanding of the invention, together with other and further objects thereof, reference is had to the following description taken in connection with the accompanying drawings, and its scope will be pointed out in the appended claims.

Figure 1:
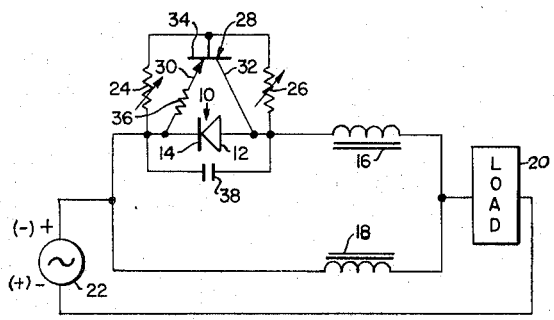
FIGS. 1 and 2 are schematic circuits of the invention embodied in one type of full-wave self-saturating magnetic amplifier.

Referring more particularly to FIG. 1, there is represented a full-wave self-saturating magnetic amplifier embodying the control circuit for controlling the magnetic amplifier output in accordance with the teachings of the present invention. The magnetic amplifier includes a unidirectional conductive device 10, such as a silicon rectifier, which presents a low impedance to current flow in one direction and present a very high impedance to current flow in the other direction. The terms forward current and reverse current are used to describe the current flow when the device 10 presents a low impedance and a high impedance, respectively. For descriptive convenience, it will be assumed that the arrowhead portion of the rectifiers shown in the drawings point in the direction opposite to electron flow through the rectifiers constituting the forward current flow. Forward current flow exists when the anode 12, represented by the arrowhead portion of the symbol, is positive with respect to the cathode 14 of the rectifier 10. The rectifier 10 is connected in series with a saturable reactor 16. A second circuit branch including a saturable reactor 18 is connected in parallel with the circuit branch including rectifier 10 and saturable reactor 16. A load 20 is connected to one end of the parallel circuit combination and in series with a source of alternating voltage 22 connected to the other end of the parallel circuit combination.

The control circuit for controlling the output of the magnetic amplifier includes the resistance elements 24 and 26 connected in series to form a circuit branch connected in parallel with rectifier 10. A PNP type transistor 28 having an emitter 30, collector 32, and base 34, is connected to conduct when the anode 12 of rectifier 10 is negative with respect to the cathode 14, i.e., when reverse current flow is passing through rectifier 10. The resistance element 24 of the circuit branch connected in parallel with rectifier 10 is shown connected to the cathode 14 of rectifier 10, while resistance element 26 is connected to the anode 12 of rectifier 10.

With these connections for resistance elements 24 and 26, the base 34 is connected at a point intermediate the two resistance elements 24 and 26 and the collector 32 is connected to the anode 12. The emitter 30 is connected to the cathode 14 via a resistance element 36, which can be eliminated in some cases. The resistance element 36 is used to provide degenerative stabilization. This arrangement provides voltages of proper polarity to cause the transistor 28 to conduct when the rectifier 10 is passing reverse current flow. Thus, the voltage developed across the resistance elements 24 and 26 when rectifier 10 is presenting a high impedance to current flow will cause the emitter 30 to be positive with respect to the base 34 and the collector 32 to be negative with respect to the base 34 as is required for operation of a PNP type transistor.

A capacitor 38 is shown connected in parallel with rectifier 10 to eliminate transient voltage peaks that may damage the transistor 28.

The operation of the control circuit to control the power delivered to the load 20 is best described by first considering the control circuit as merely a variable impedance connected in parallel with the rectifier 10.

The polarity of the negative half-cycles of the alternating voltage is indicated at the terminals of power source 22 by the plus and minus symbols. The polarity of the positive half cycles is indicated by the plus and minus symbols shown in parentheses at the terminals of power source 22.

Assume the impedance connected across rectifier 10 is at its maximum value. During the positive half-cycles of the voltage provided by power supply 22, the current path including the saturable reactor 16 presents the least impedance to the flow of current since its flux is maintained at substantially the saturation value caused by the preceding positive half-cycle. The impedance presented by the circuit branch including saturable reactor 16 and rectifier 10 is then equal to the resistance inherent in the winding for the saturable reactor 16.

Saturable reactor 18, on the other hand, presents a high impedance when a positive half-cycle of the voltage provided by power source 22 is applied to the circuit. This is due to the saturable reactor 18 having been saturated by current flowing through its winding during the preceding negative half-cycle of the alternating voltage from power source 22. The positive half-cycle tends to change the flux in saturable reactor 18 set up by the preceding negative half-cycle inducing a counter E.M.F. and, therefore, presents a high impedance to current flow during the positive half-cycle of the power supply voltage.

During the negative half-cycles of the alternating voltage provided by power source 22, the current path including saturable reactor 16 presents a high impedance since the impedance connected in parallel with rectifier 10 has been assumed to have its maximum value, and rectifier 10, of course, is poled to present a high impedance to current flow during the negative half-cycles. The path via the winding of saturable reactor 18, on the other hand, presents an impedance equal only to the resistance inherent in the winding of saturable reactor 18. That is, there is substantially no change in flux to oppose the flow of current through saturable reactor 18 as its saturated condition has not been altered by the previous positive half-cycle of the power supply voltage.

Thus, with the impedance connected across rectifier 10 at its maximum value, maximum current will flow through load 20 during each half-cycle of the input voltage since the firing angle (phase angle of the applied voltage at the time the core of a saturable reactor reaches saturation) for each saturable reactor is near zero to provide full power, full wave output.

Assume now that the impedance connected in parallel with rectifier 10 is at its minimum value. In this case, rectifier 10 is effectively shorted so that the circuit including saturable reactor 16 is equivalent to the circuit including saturable reactor 18. The current through load 20 is then at a minimum value during each half-cycle since the flux established in one direction in each of these saturable reactors by one-half cycle of the power supply voltage is reestablished in the other direction by the next half-cycle. The only current flowing during each half-cycle is the small reset current needed to reverse the flux established in each saturable reactor during the previous half-cycle. The firing angle is then near 180° and the power delivered to load 20 is negligible.

It is apparent that the firing angle for saturable reactor 16 will occur between 0° and 180° as the impedance connected across rectifier 10 is varied between its maximum value and minimum value while the firing angle for saturable reactor 18 will occur between 180° and 360°. Or, stated another way, an increase in the reset current to saturable reactor 16, i.e., the current flowing through the saturable reactor 16 when the polarity of the voltage at the power source 22 is such that the current flow through the rectifier 10 is in the inverse or high impedance direction, will result in a decrease in the power supplied to the load 20.

The control circuit connected in parallel with rectifier 10 is used to vary the reset current. The reset current is the sum of the reverse current through rectifier 10, the current through resistance devices 24 and 26, and the collector current from transistor 28. The largest portion of the reset current is supplied by the collector current. This is controlled by varying either of the resistances presented by resistance devices 24 or 26 dependent on the direction of control desired. Assuming the reset current is a minimum, if resistance element 24 is varied to control the power output, resistance element 24 must be increased to reduce the power output. By increasing resistance element 24, the current shunt action between the emitter 30 and the base 34 is decreased and the current shunt action between the collector 32 and base 34 is in relation increased, causing the base and hence the collector current to increase. If resistance element 26 were varied to control the power supply, resistance element 26 must be decreased to reduce the power output. Decreasing resistance element 26 causes the current shunt action between the collector 32 and base 34 to increase and the current shunt action between the emitter 30 and base 34 in relation to decrease, causing the base and collector current and hence the reset current to increase, resulting in a decrease in the power supplied to the load 20.

Thus, the controlling impedance element can be resistance element 24 having a positive slope characteristic or resistance element 26 having a negative slope characteristic or presence of both controlling elements having opposite slopes for maximum gain. This feature of the control circuit thus gives the design engineer greater choice in his selection of a device to provide the controlling impedance where the power to be delivered to the load 20 is to vary in response to some physical condition.

Since the collector current of the transistor supplies the greater portion of the reset current, the power requirement for the variable resistance device is very small. Dependent on the gain of the transistor, the power dissipated by the controlling resistance is in the order of 500,000 to 5,000,000 times smaller than the full load power supplied.

In addition to acting as a power amplifying device, the transistor action results in a reduction or narrowing of the proportional band, i.e., the ratio of resistance change needed for varying the power output through the full range.

Figure 2:
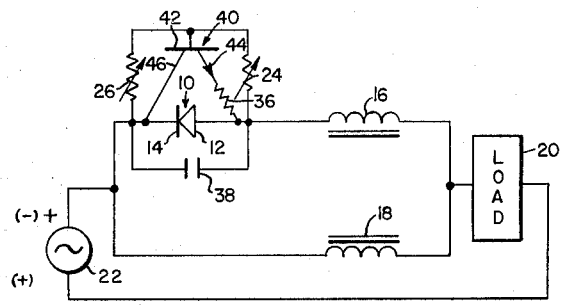

FIG. 2 is a modification of FIG. 1. In FIG. 2, and also in subsequent figures, elements corresponding to elements of FIG. 1 are designated by similar reference numerals. In FIG. 2, a NPN type transistor 40 having a base 42, an emitter 44, and a collector 46 is employed in place of the PNP type transistor 28 of FIG. 1. The base 42 of transistor 40 is connected intermediate the resistance presented by devices 24 and 26 as in FIG. 1. The emitter 44, however, is connected via resistance 36 to the anode 12 of rectifier 10 rather than the cathode 14 as in FIG. 1. In addition, the collector 46 is connected to the cathode 14 rather than the anode 12 as in FIG. 1. It should be noted that resistance device 24 remains connected between the base and emitter of the transistor and resistance device 26 remains connected between the base and collector of the transistor. Connecting the NPN type transistor 40, as shown in FIG. 2, provides the proper polarity voltage relationship between the base 42 and emitter 44 and the base 42 and collector 46 so that the transistor 40 will conduct when current through the rectifier 10 is in the reverse or high resistance direction as in the case for the PNP type transistor 28 of FIG. 1.

The operation of the circuit of FIG. 2 is similar to that of FIG. 1 with variations in resistance presented by resistance devices 24 and 26 producing the same control over the power output as was described for FIG. 1.

Considering the circuit between the saturable reactor 16 and the alternating current source 22 of FIGS. 1 and 2 as a two-terminal network, it is apparent that the circuit would operate the same were the terminal connections reversed, i.e., the cathode 14 of rectifier 10 connected to the saturable reactor 16 and the anode 12 connected to the alternating voltage source 22.

Figure 3:
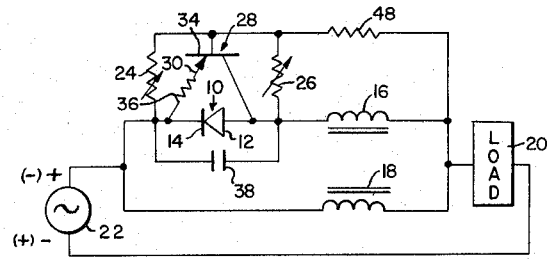
FIGS. 3 through 6 are modifications of FIGS. 1 and 2 embodying the feedback circuit in accordance with the invention.

FIG. 3 is a modification of FIG. 1. A resistance element 48 is connected in parallel with the series combination of resistance element 26 and saturable reactor 16. The addition of resistance element 48 provides a positive feedback path which is effective to decrease the proportional band. The effect of resistance element 48 is dependent on the voltage supported by the saturable reactor 16 which is a function of the reset current. When no reset current is provided, the saturable reactor 16 is supporting no voltage and maximum voltage is developed across the load 20. Neither resistance element 26 nor resistance element 48 then provides current to the base 34 so that the combination of resistance 26 and resistance 48 is essentially equal to resistance 26 alone so that conditions are then essentially the same as for the circuit of FIG. 1. When reset current starts to flow by increasing resistance element 24, the saturable reactor 16 supports some voltage causing resistance 48 to increase the base and hence the collector current at a greater rate to produce greater magnetic flux reset to saturable reactors 16 and 18, which in turn cause a further increase in the reset current. Since this action is reinforcing, it is positive feedback. It has been found a circuit constructed in accordance with FIG. 1 requiring approximately a 4 to 1 change in the controlling resistance to provide full range control can be adjusted to work on a 1.5 to 1 or smaller resistance ratio when provided with the positive feedback as shown in FIG. 3. It is further obvious that resistance 48 can be made adjustable to provide additional control action. Thus, when resistance 48 is changed, the proportional band and hence the gain of the amplifier is changed.

Figure 4:
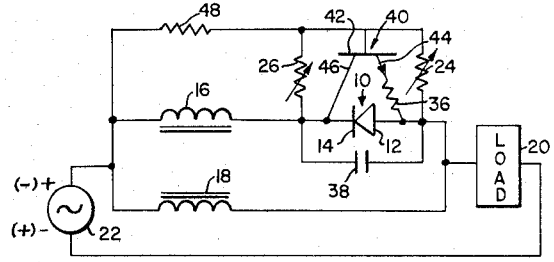

FIG. 4 is a modification of the circuit shown in FIG. 2 which employs a NPN type transistor. Resistance 48 is employed to obtain positive feedback for the control circuit and as in FIG. 3 is connected in parallel with the series combination of saturable reactor 16 and resistance 26.

Figure 5:
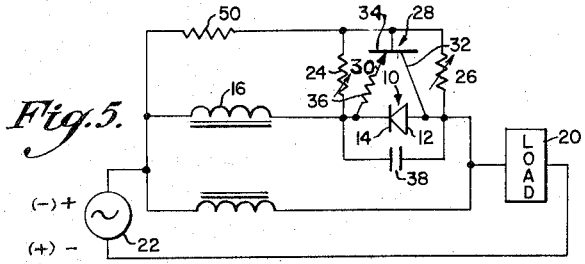

FIG. 5 is a modification of the circuit shown in FIG. 1. A resistance element 50 is connected in parallel with the series combination of resistance element 24 and saturable reactor 16. In this case, the resistance element 50 provides negative feedback or degeneration which is an advantage in some applications. As is the case in FIGS. 3 and 4, where feedback resistance element 48 can be made adjustable to provide further control action, feedback resistance element 50 can be made adjustable to alter the proportional band and, hence, the gain of the amplifier.

Figure 6:
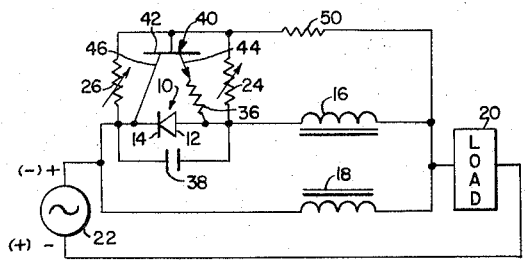

FIG. 6 is a modification of the circuit shown in FIG. 2. FIG. 2 is modified to provide negative feedback in the same manner as FIG. 1 was modified as shown in FIG. 5. Resistance element 50, as in FIG. 5, is connected in parallel with the series combination of saturable reactor 16 and resistance 24.

The control circuits described in connection with FIGS. 1-6, inclusive, may also be used in half-wave self-saturating magnetic amplifiers. FIGS. 1-6, inclusive, can be modified to provide half-wave self-saturating magnetic amplifiers by removing the saturable reactor 18 in each case. This limits the output to only one half of each cycle of the alternating current supplied from the power source 22. In addition, it also requires that a high voltage type transistor be utilized since full reverse voltage will appear across the rectifier 10.

Figure 7:
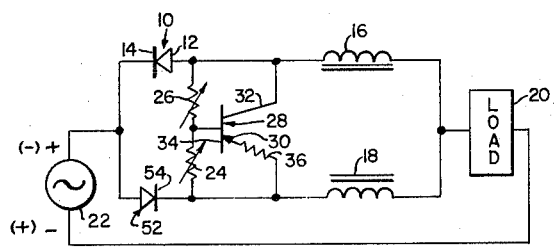
FIGS. 7 and 8 are schematic circuits of the invention embodied in another type of full-wave self-saturating magnetic amplifier.
Figure 8:
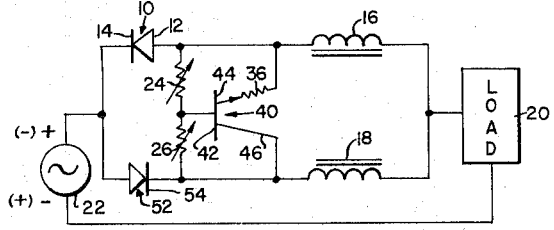

FIGS. 7 and 8 show the control circuit connected to a full-wave self-saturating magnetic amplifier employing two unidirectional conductive devices. A rectifier 52 is connected in series with saturable reactor 18 and the combination is connected in parallel with the circuit branch including rectifier 10 and saturable reactor 16. It should be noted that rectifiers 10 and 52 are oppositely poled. In FIG. 7, the control circuit of FIG. 1 including resistance elements 24 and 26 and PNP type transistor 28 is connected across both rectifiers. Thus, resistance element 26 is connected to anode 12 of rectifier 10. Resistance element 24 is connected to cathode 54 of rectifier 52. The transistor 28 is connected to the resistance elements 24 and 26 as in FIG. 1. Similarly, in FIG. 8, the control circuit of FIG. 2, including resistance elements 24 and 26 and NPN transistor 40, is connected across both rectifiers. Resistance element 26 is connected to the cathode 54 of rectifier 52, while resistance element 24 is connected to the anode 12 of rectifier 10. The transistor 40 is connected to the resistance elements 24 and 26 as in FIG. 2.

During negative half-cycles of the alternating voltage supplied from the alternating voltage source 22, rectifier 52 presents a very low impedance making the circuit electrically the same as that shown in FIG. 1 during the negative half-cycles. The control circuit then determines the reset current for saturable reactor 16. During positive half-cycles of the alternating voltage supplied from the power source 22, rectifier 10 presents a very low impedance while rectifier 52 presents a very high impedance to current flow. The control circuit is then effectively connected in parallel with rectifier 52 and operates to determine the reset current for the saturable reactor 18. The operation of the circuit shown in FIG. 8, using a NPN type transistor 40 in the control circuit, is similar to that of FIG. 7.

Figure 9:
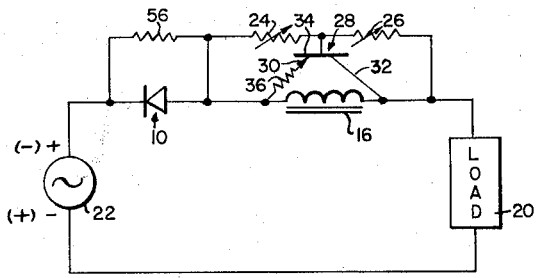
FIGS. 9 and 10 are schematic circuits of another embodiment of the invention for controlling a self-saturating magnetic amplifier.
Figure 10:
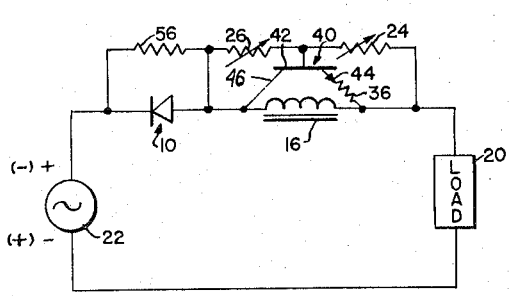

FIGS. 9 and 10 are schematic circuits showing the control circuit connected in parallel with the saturable reactor 16 for controlling the reset current passing through the saturable reactor 16. In FIG. 9, the control circuit of FIG. 1 connected across the rectifier 10 is connected across saturable reactor 16 in FIG. 9. In FIG. 10, the control circuit of FIG. 2 connected across rectifier 10 is connected across saturable reactor 16 in FIG. 10.

In each case, a resistance 56 is connected in parallel with rectifier 10 and has a value such as to cause full reset current to pass around rectifier 10. The fraction of the reset current flowing through resistance 56 that passes through saturable reactor 16, of course, determines the amount of magnetic flux reset that takes place in saturable reactor 16. The amount of reset current passing through saturable reactor 16 is determined by the control circuit connected in parallel with saturable reactor 16.

As is the case in the circuits shown in FIGS. 1–8, inclusive, the operation of the control circuit when connected in parallel with reactor 16 is such that either resistor 24 or 26 may be varied to change the flux reset in saturable reactor 16. It is apparent that a decrease in resistance element 24 is effective to reduce the collector current and thus cause an increase in the amount of reset current passing through saturable reactor 16 and, consequently, reduce the power supplied to the load 20. If resistance element 26 is used as the controlling impedance, an increase in the resistance presented by resistance element 26 will result in the decrease in the power supplied to load 20.

Although a half-wave type self-saturating magnetic amplifier is shown in FIGS. 9 and 10, it should be understood that the connection of the control circuit in parallel with the saturable reactor 16 for controlling the output to load 20 is equally applicable to a full-wave self-saturating magnetic amplifier of the type shown in FIGS. 1–6, inclusive.

The invention may be embodied in other specific forms without departing from the spirit or essential characteristics thereof. The present embodiments are therefore to be considered in all respects as illustrative and not restrictive, the scope of the invention being defined by the appended claims.

We claim:

1. An electrical circuit energized by an alternating voltage source comprising a first circuit portion including a unidirectional conductive device; a second circuit portion including a saturable reactor connected in series with said first circuit portion; a third circuit portion, including two series connected impedance elements, at least one of which is variable, connected in parallel with one of said first and second circuit portions; a transistor having a base, emitter, and collector; means connecting said base to a point intermediate said series connected impedance elements; means connecting said emitter to one end of said series connected impedance elements; and means connecting said collector to the other end of said series connected impedance elements, whereby said transistor controls the current through said second circuit portion in response to the impedance presented by said impedance elements when said unidirectional conductive device is presenting a high impedance to the flow of current.

2. In a magnetic amplifier for connection in series with a load and source of alternating voltage for controlling the power delivered to the load, the combination comprising a first circuit portion including a unidirectional conductive device; a second circuit portion including a saturable reactor connected in series with said unidirectional conductive device; a third circuit portion, including two series connected resistance elements, at least one of which is variable, connected in parallel with one of said first and second circuit portions; a transistor having a base, emitter and collector; means connecting said base to a point intermediate said series connected resistance elements; means connecting said emitter to one end of said series connected resistance elements; and means connecting said collector to the other end of said series connected resistance elements, whereby said transistor controls the current passing through said saturable reactor in response to the resistance presented by said resistance elements when said unidirectional conductive device is presenting a high impedance to the flow of current.

3. In a magnetic amplifier for connection in series with a load and source of alternating voltage for controlling the power delivered to the load, the combination comprising a first circuit branch including a saturable reactor connected in series with a unidirectional conductive device; a second circuit branch connected in parallel with said device, said second branch including two series connected resistance elements, at least one of which is variable; a transistor having a base, emitter, and collector; means connecting said base to a point intermediate said series connected resistance elements; means connecting said emitter to one end of said series connected resistance elements; and means connecting said collector to the other end of said series connected resistance elements, whereby said transistor controls the current passing through said saturable reactor in response to the resistance presented by said resistance elements when said device is presenting a high impedance to the flow of current.

4. In a magnetic amplifier for connection in series with a load and the source of alternating voltage for controlling the power delivered to the load, the combination comprising a first circuit branch including a saturable reactor connected in series with a unidirectional conductive device; a second circuit branch connected in parallel with said device, said second circuit branch including two series connected resistance elements, at least one of which is variable; a resistance element connected in parallel with said saturable reactor and one of said series connected resistance elements; a transistor having a base, emitter, and collector; means connecting said base to a point intermediate said series connected resistance elements; means connecting said emitter to one end of said series connected resistance elements; and means connecting said collector to the other end of said series connected resistance elements whereby said transistor controls the current passing through said saturable reactor in response to the resistance presented by said series connected resistance elements when said device is presenting a high impedance to the flow of current.

5. In a magnetic amplifier for connection in series with a load and source of alternating voltage for controlling the power delivered to the load, the combination comprising a first circuit branch including a saturable reactor connected in series with a unidirectional conductive device; two series connected resistance elements connected in parallel with said device, at least one of which is variable; a transistor having a base, emitter and collector; a second circuit branch including a second saturable reactor connected in parallel with said first circuit branch; means connecting said base to a point intermediate said resistance elements; means connecting said emitter to one end of said series connected resistance elements; and means connecting said collector to the other end of said series connected resistance elements, whereby said transistor controls the current to said load in response to the resistance presented by said resistance elements.

6. In a magnetic amplifier for connection in series with a load and a source of alternating voltage for controlling the power delivered to the load, the combination comprising a first circuit branch including a saturable reactor connected in series with a unidirectional conductive device; a second circuit branch connected in parallel with said device, said second branch including two series connected impedance elements, at least one of which is variable; a transistor having a base, emitter, and collector; means connecting said base to a point intermediate said series connected impedance elements; means connecting said emitter to one end of said series connected impedance elements; and means connecting said collector to the other end of said series connected impedance elements, whereby said transistor controls the current passing through said saturable reactor in response to the impedance presented by said impedance elements when said device is presenting a high impedance to the flow of current.

7. In a magnetic amplifier for connection in series with a load and a source of alternating voltage for controlling the power delivered to the load, the combination comprising a first circuit branch including a saturable reactor connected in series with a unidirectional conductive device; a second circuit branch connected in parallel with said device, said second circuit branch including two series connected impedance elements, at least one of which is variable; an impedance element connected in parallel with said saturable reactor and one of said series connected impedance elements; a transistor having a base, emitter, and collector; means connecting said base to a point intermediate said series connected impedance elements; means connecting said emitter to one end of said series connected impedance elements; and means connecting said collector to the other end of said series connected impedance elements whereby said transistor controls the current passing through said saturable reactor in response to the impedance presented by said series connected impedance elements when said device is presenting a high impedance to the flow of current.

8. In a magnetic amplifier for connection in series with a load and a source of alternating voltage for controlling the power delivered to the load, the combination comprising a first circuit branch including a saturable reactor connected in series with a unidirectional conductive device; two series connected impedance elements, at least one of which is variable, connected in parallel with said device; a transistor having a base, emitter and collector; a second circuit branch including a second saturable reactor connected in parallel with said first circuit branch; means connecting said base to a point intermediate said impedance elements; means connecting said emitter to one end of said series connected impedance elements; and means connecting said collector to the other end of said series connected impedance elements, whereby said transistor controls the current to said load in response to the impedance presented by said impedance elements.

9. In a magnetic amplifier for connection in series with a load and a source of alternating voltage for controlling the power delivered to the load, the combination comprising a first circuit portion including a unidirectional conductive device connected in series with a saturable reactor; a second circuit portion connected in parallel with said first circuit portion, said second circuit portion including a unidirectional device connected in series with a saturable reactor; a third circuit portion, including two series connected resistance elements, at least one of which is variable, connected in parallel with said unidirectional devices forming a circuit loop including said unidirectional devices; a transistor having a base, emitter and collector; means connecting said base to a point intermediate said resistance elements; means connecting said emitter to one end of said series connected resistance elements; and means connecting said collector to the other end of said series connected resistance elements, whereby said transistor controls the reset current for said saturable reactors in response to the resistance presented by said resistance elements.

10. In a magnetic amplifier for connection in series with a load and a source of alternating voltage for controlling the power delivered to the load, the combination comprising a first circuit portion including a unidirectional conductive device connected in series with a saturable reactor; a second circuit portion connected in parallel with said first circuit portion, said second circuit portion including a unidirectional device connected in series with a saturable reactor; a third circuit portion, including two series connected impedance elements, at least one of which is variable, connected in parallel with said unidirectional devices forming a circuit loop including said unidirectional devices; a transistor having a base, emitter and collector; means connecting said base to a point intermediate said impedance elements; means connecting said emitter to one end of said series connected impedance elements; and means connecting said collector to the other end of said series connected impedance elements, whereby said transistor controls the reset current for said saturable reactors in response to the impedance presented by said impedance elements.

11. In a magnetic amplifier for connection in series with a load and a source of alternating voltage for controlling the power delivered to the load; the combination comprising a first circuit branch including a saturable reactor connected in series with a unidirectional conductive device; two series connected resistance elements connected in parallel with said device, at least one of which is variable; a transistor having a base, emitter and collector; means connecting said base to a point intermediate said resistance elements; means connecting said emitter to one end of said series connected resistance elements; and means connecting said collector to the other end of said series connected resistance elements, whereby said transistor controls the current flow through said saturable reactor in response to the resistance presented by said resistance elements when said unidirectional conductive device is presenting a high impedance to the flow of current.

12. In a magnetic amplifier for connection in series with a load and a source of alternating voltage for controlling the power delivered to the load, the combination comprising a first circuit branch including a saturable reactor connected in series with a unidirectional conductive device; two series connected impedance elements, at least one of which is variable, connected in parallel with said device; a transistor having a base, emitter and collector; means connecting said base to a point intermediate said impedance elements; means connecting said emitter to one end of said series connected impedance elements; and means connecting said collector to the other end of said series connected impedance elements, whereby said transistor controls the current flow through said saturable reactor in response to the impedance presented by said impedance elements when said device is presenting a high impedance to the flow of current.

13. In a magnetic amplifier for connection in series with a load and a source of alternating voltage for controlling the power delivered to the load, the combination including a first circuit branch including a saturable reactor connected in series with a unidirectional conductive device; two series connected resistance elements, at least one of which is variable, connected in parallel with said saturable reactor, a resistance element connected in parallel with said device; a transistor having a base, emitter and collector; means connecting said base to a point intermediate said resistance elements; means connecting said emitter to one end of said series connected resistance elements; and means connecting said collector to the other end of said series connected resistance elements, whereby said transistor controls the current flow to said saturable reactor in response to the resistance presented by said series connected resistance elements when said device is presenting a high impedance to the flow of current.

14. In a magnetic amplifier for connection in series with a load and a source of alternating voltage for controlling the power delivered to the load, the combination including a first circuit branch including a saturable reactor connected in series with a unidirectional conductive device; two series connected impedance elements, at least one of which is variable, connected in parallel with said saturable reactor, an impedance element connected in parallel with said device; a transistor having a base, emitter and collector; means connecting said base to a point intermediate said impedance elements; means connecting said emitter to one end of said series connected impedance elements; and means connecting said collector to the other end of said series connected impedance elements, whereby said transistor controls the current flow to said saturable reactor in response to the impedance presented by said series connected impedance elements when said device is presenting a high impedance to the flow of current.

15. In a magnetic amplifier for connection in series with a load and a source of alternating voltage for controlling the power delivered to the load; the combination comprising a first circuit branch including a saturable reactor connected in series with a unidirectional conductive device; a second circuit branch connected in parallel with said device, said second circuit branch including two series connected resistance elements, at least one of which is variable; a resistance element connected in parallel with said saturable reactor and one of said series connected resistance elements; a second saturable reactor connected in parallel with said first circuit branch; a transistor having a base, emitter, and collector; means connecting said base to a point intermediate said series connected resistance elements; means connecting said emitter to one end of said series connected resistance elements; and means connecting said collector to the other end of said series connected resistance elements whereby said transistor controls the current to said load in response to the resistance presented by said series connected resistance elements.

16. In a magnetic amplifier for connection in series with a load and a source of alternating voltage for controlling the power delivered to the load, the combination comprising a first circuit branch including a saturable reactor connected in series with a unidirectional conductive device; a second circuit branch connected in parallel with said device, said second circuit branch including two series connected impedance elements, at least one of which is variable; an impedance element connected in parallel with said saturable reactor and one of said series connected impedance elements; a second saturable reactor connected in parallel with said first circuit branch; a transistor having a base, emitter, and collector; means connecting said base to a point intermediate said series connected impedance elements; means connecting said emitter to one end of said series connected impedance elements; and means connecting said collector to the other end of said series connected impedance elements whereby said transistor controls the current to said load in response to the impedance presented by said series connected impedance elements.

17. In a magnetic amplifier for connection in series with a load and a source of alternating voltage for controlling the power delivered to the load; the combination comprising a first circuit branch including a saturable reactor connected in series with a unidirectional conductive device; a second circuit branch connected in parallel with said device, said second branch including two series connected resistance elements, at least one of which is variable; a second saturable reactor connected forming a circuit loop including the saturable reactor of said first circuit branch and said series connected resistances; a transistor having a base, emitter, and collector; means connecting said base to a point intermediate said series connected resistance elements; means connecting said emitter to one end of said series connected resistance elements; and means connecting said collector to the other end of said series connected resistance elements, whereby said transistor controls the current to the load in response to the resistance presented by said resistance elements.

18. In a magnetic amplifier for connection in series with a load and a source of alternating voltage for controlling the power delivered to the load, the combination comprising a first circuit branch including a saturable reactor connected in series with a unidirectional conductive device; a second circuit branch connected in parallel with said device, said second branch including two series connected impedance elements, at least one of which is variable; a second saturable reactor connected forming a circuit loop including the saturable reactor of said first circuit branch and said series connected impedance elements; a transistor having a base, emitter, and collector; means connecting said base to a point intermediate said series connected impedance elements; means connecting said emitter to one end of said series connected impedance elements; and means connecting said collector to the other end of said series connected impedance elements, whereby said transistor controls the current to the load in response to the impedance presented by said impedance elements.

References Cited by the Examiner

UNITED STATES PATENTS

| | | | |
|---|---|---|---|
| 2,798,904 | 7/1957 | Alexanderson | 330—8 X |
| 2,902,547 | 9/1959 | Rowley et al. | 330—8 X |
| 3,022,454 | 2/1962 | Millis | 307—146 X |
| 3,045,174 | 7/1962 | Lafuze | 307—88.5 |

LLOYD McCOLLUM, *Primary Examiner.*

MILTON O. HIRSHFIELD, *Examiner.*